US005722677A

United States Patent [19]

Lichter et al.

[11] Patent Number: 5,722,677
[45] Date of Patent: Mar. 3, 1998

[54] APPARATUS FOR THE TRANSPORTATION OF TRUCKS

[75] Inventors: Nicholas J. Lichter, Kenosha, Wis.; Curtis E. Lynch, North Lewisburg, Ohio

[73] Assignee: ATC Leasong Company, Kenosha, Wis.

[21] Appl. No.: 291,767

[22] Filed: Aug. 17, 1994

Related U.S. Application Data

[63] Continuation-in-part of Ser. No. 5,849, Jan. 19, 1993, abandoned.

[51] Int. Cl.$^6$ .................. B60P 3/07; B60P 3/12
[52] U.S. Cl. .......... 280/402; 280/407.1; 280/482; 414/563
[58] Field of Search .................. 280/476.1, 402, 280/405.1, 406.1, 407, 407.1, 456.1, 495, 498, 438.1, 433, 423.1, 482; 414/563

[56] References Cited

U.S. PATENT DOCUMENTS

| | | | |
|---|---|---|---|
| 2,481,223 | 9/1949 | Johnson | 414/563 |
| 3,922,006 | 11/1975 | Borges | 280/511 |
| 4,047,733 | 9/1977 | Parkes | 280/402 |
| 4,149,643 | 4/1979 | Skala et al. | 280/402 |
| 4,316,617 | 2/1982 | Flaugh | 280/402 |
| 4,383,697 | 5/1983 | F'Geppert | 280/433 |
| 4,544,175 | 10/1985 | Hubert | 280/402 |
| 4,555,214 | 11/1985 | Morton | 280/402 |
| 4,708,358 | 11/1987 | Gehman et al. | 414/563 |
| 4,815,915 | 3/1989 | Crupi | 280/402 |

FOREIGN PATENT DOCUMENTS

| 0950769 | 10/1956 | Germany | 280/402 |
|---|---|---|---|

*Primary Examiner*—Anne Marie Boehler
*Attorney, Agent, or Firm*—Reinhart, Boerner, Van Deuren, Norris & Rieselbach, s.c.

[57] ABSTRACT

Two vehicles are transported in tandem by a beam assembly connecting a lead vehicle to a trailing vehicle which is reversed end-for-end. The beam assembly includes an elongated beam which is connected to the rear and extends lengthwise of the trailing vehicle. The beam extends beyond the rear end of the trailing vehicle and is elevated and connected to the rear end of the lead vehicle at a height such that the rear wheels of the trailing vehicle are raised above ground. The connection of the beam to the lead vehicle permits the beam to swing both laterally and vertically.

10 Claims, 5 Drawing Sheets

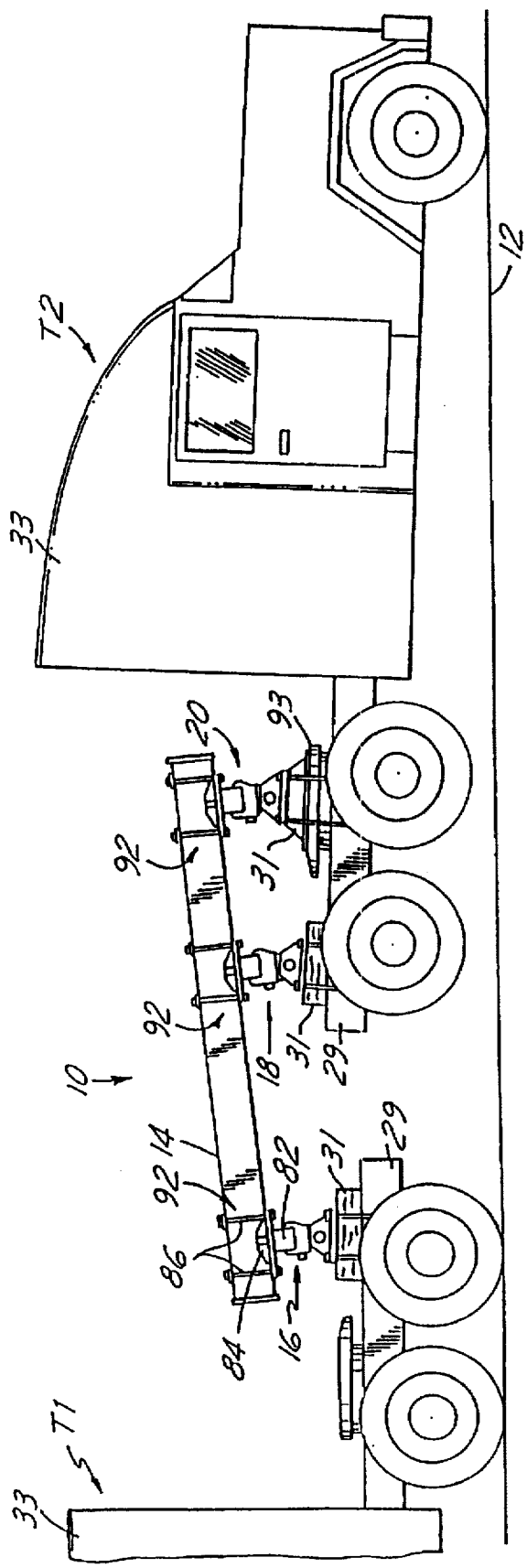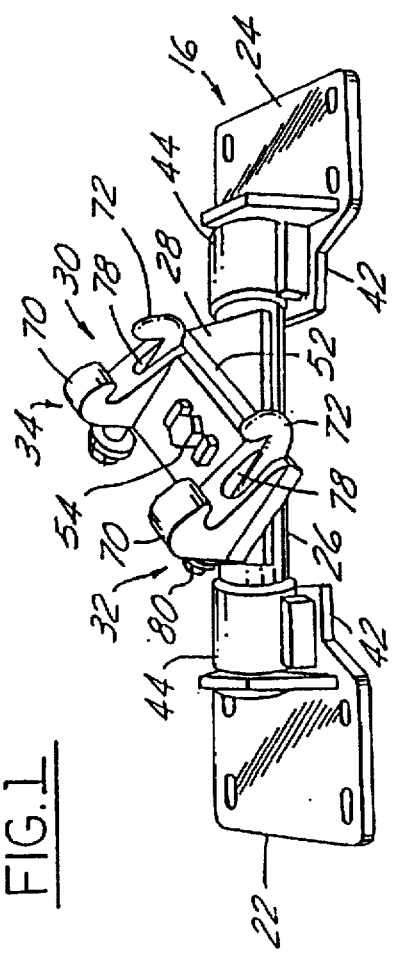
FIG.1
FIG.2

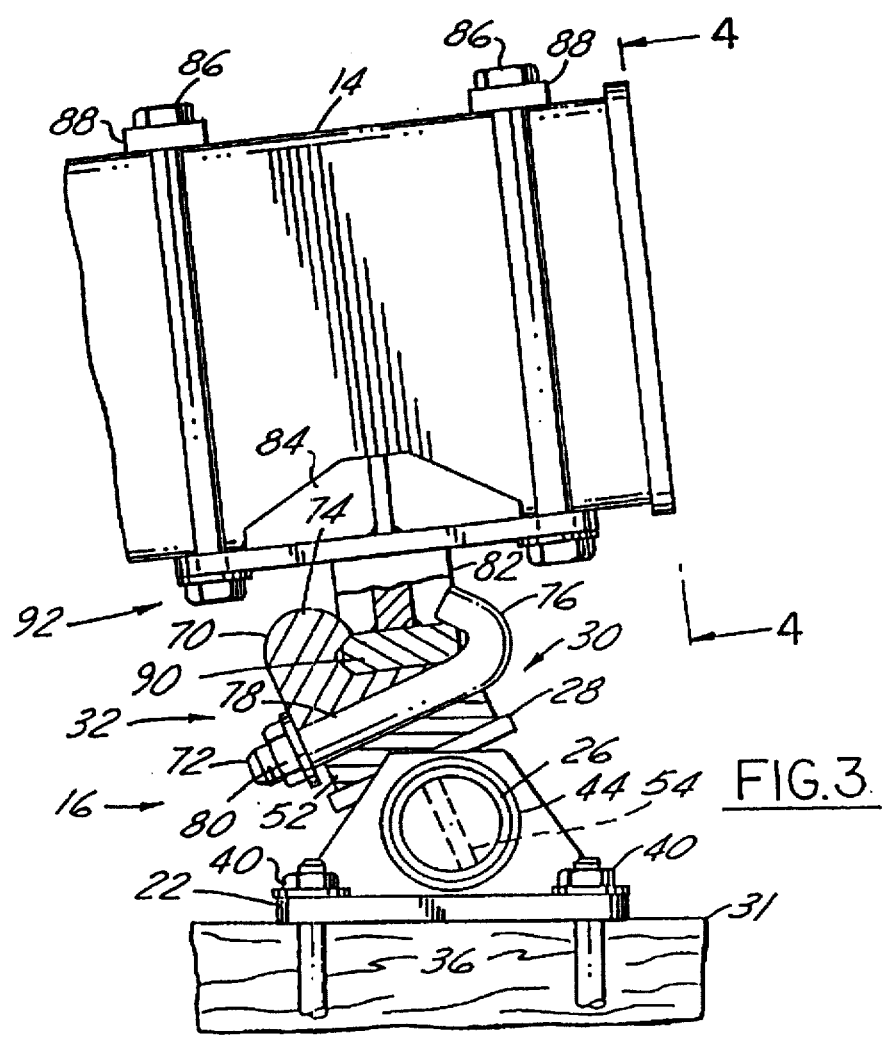
FIG.3.
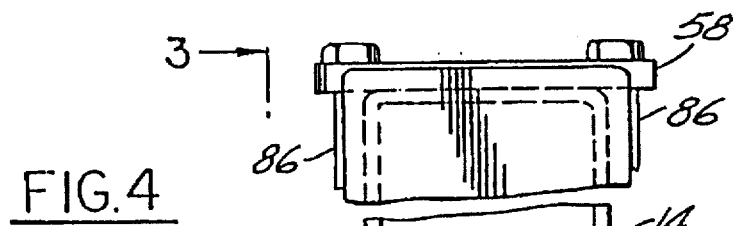
FIG.4
FIG.5
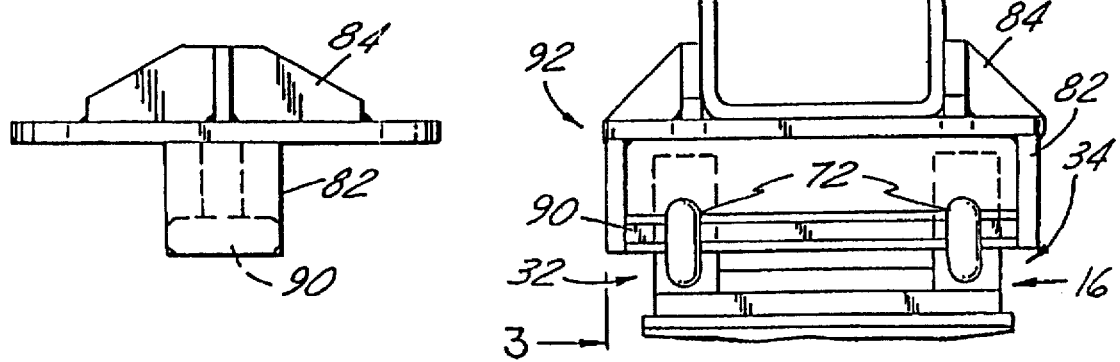

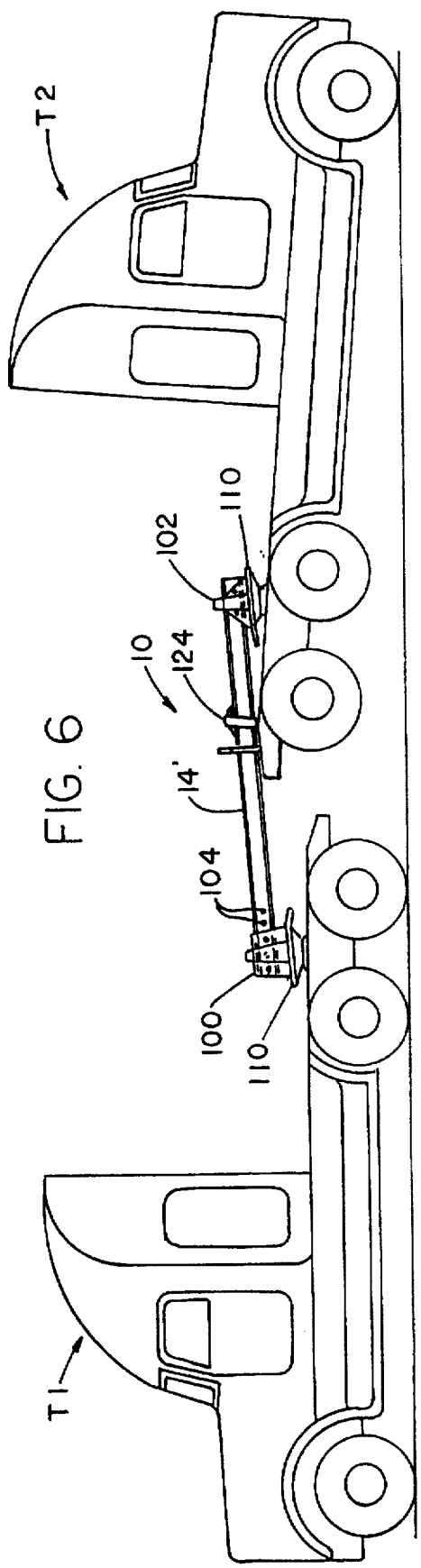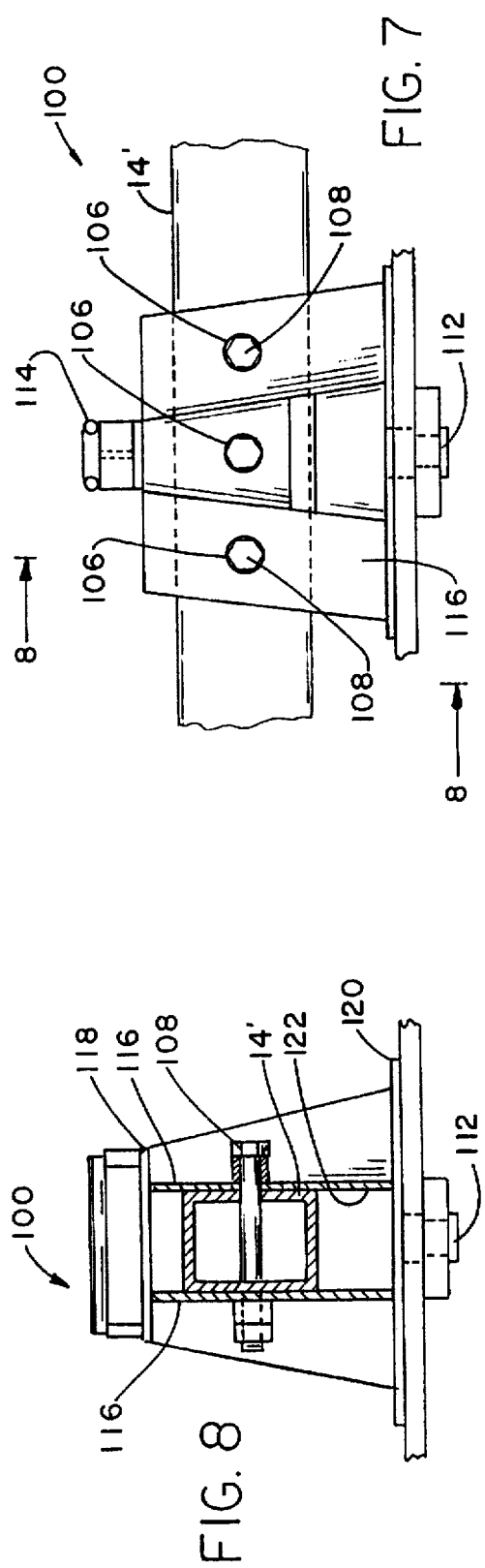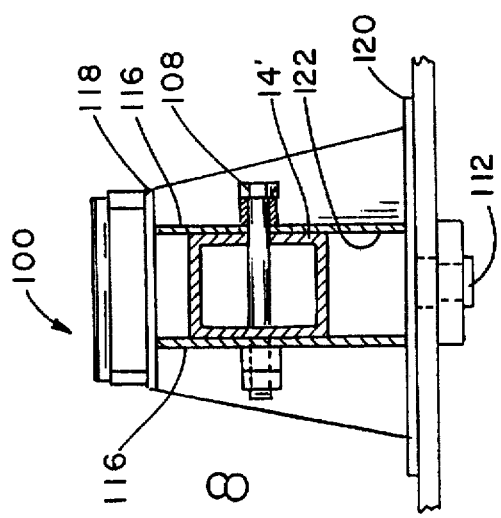

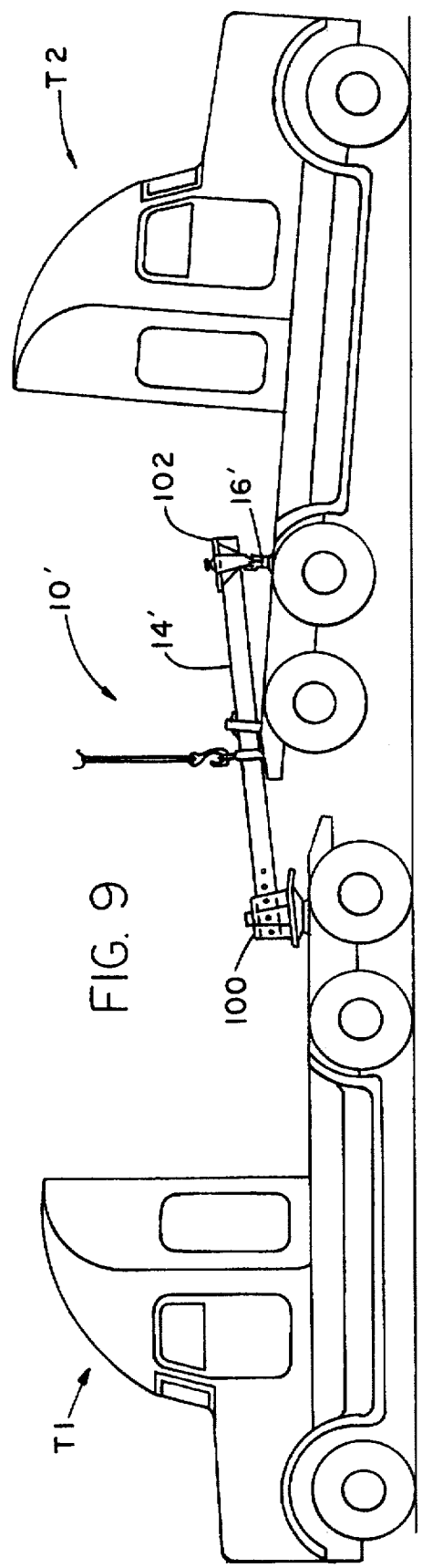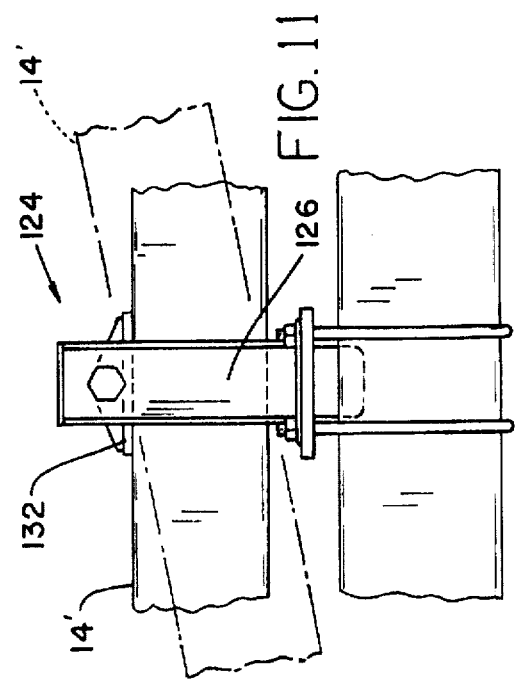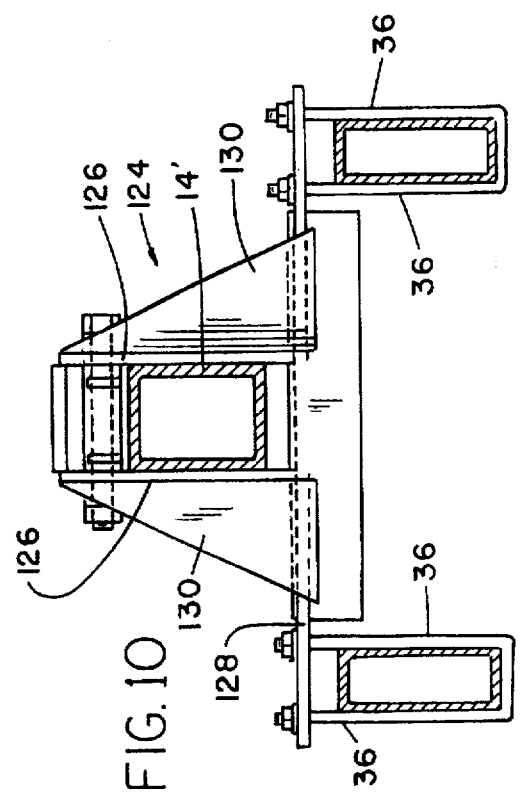

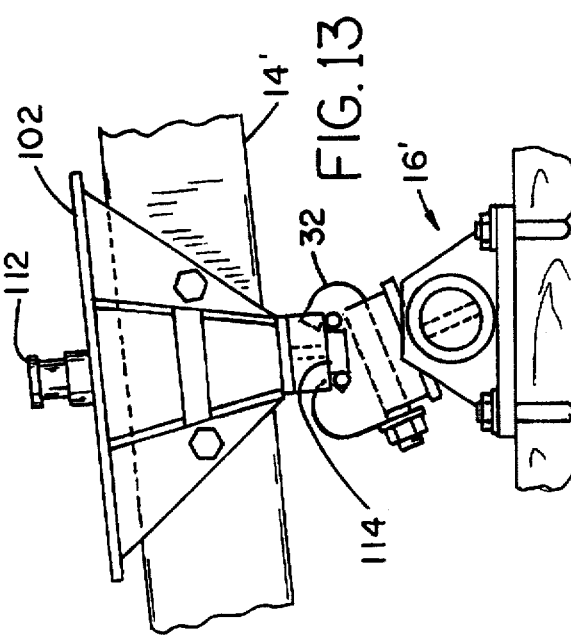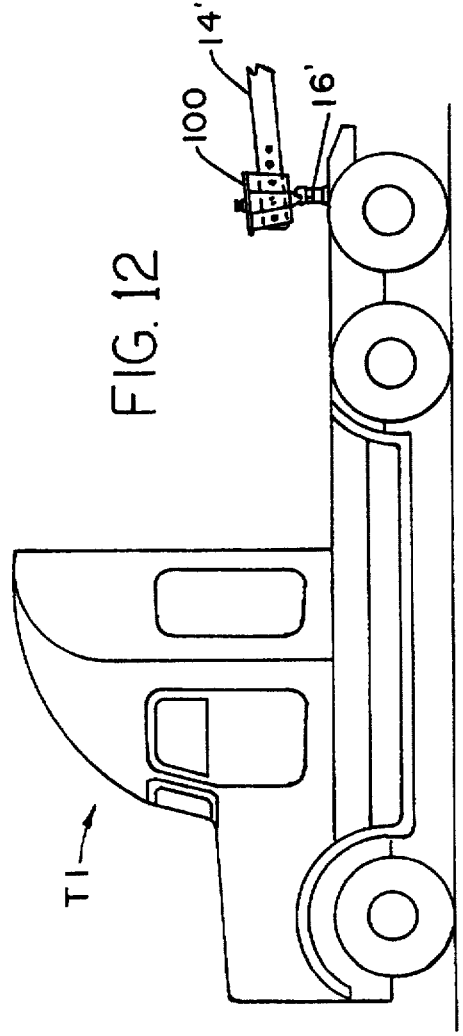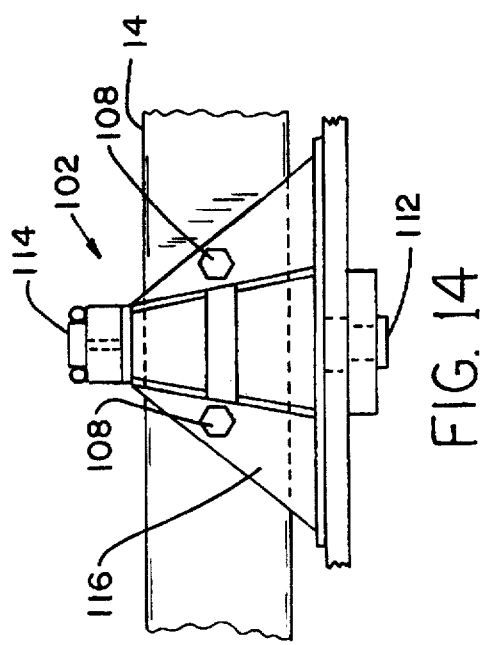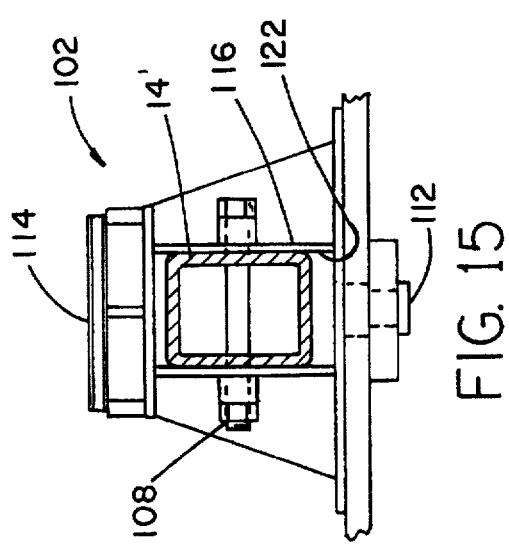

5,722,677

APPARATUS FOR THE TRANSPORTATION OF TRUCKS

RELATED APPLICATION

This is a continuation-in-part of U.S. patent application Ser. No. 08/005,849 filed Jan. 19, 1993, now abandoned

BACKGROUND OF THE INVENTION

This invention relates generally to the transportation of vehicles and relates more particularly to a beam assembly for connecting two wheeled vehicles in tandem so that the trailing vehicle can be pulled along by the lead vehicle.

SUMMARY OF THE INVENTION

The conventional way of transporting trucks in tandem is for the trailing truck to have its front end lifted up and mounted on the rear bed of a lead truck. A saddle of suitable construction on the bed of the lead truck may be connected to the front axle of the trailing truck. In many instances this is a satisfactory arrangement. However, it requires the front end of the trailing truck to be raised a substantial distance above the ground. Since the cab of the truck, which is usually the highest part of the vehicle, is at the front, and it is the front which is raised, certain practical and/or legal height restrictions are sometimes exceeded.

In accordance with the present invention, the trailing truck is reversed end for end and attached to the lead truck but without supporting it on the bed of the lead truck. More specifically, an elongated beam disposed lengthwise of the trailing truck has one end connected to the rear end of the trailing truck in a manner such that when the other end of the beam is raised the rear end of the trailing truck is also raised. The beam is elevated and connected to the rear end of the lead truck at a height such that the rear wheels of the trailing truck are raised above the ground to facilitate transportation. Preferably, the connection of the beam to the lead truck permits the beam to swing both laterally and vertically.

As a result of this novel construction, the rear wheels of the trailing truck are raised only a small distance above the ground so that the overall height of the trailing truck is increased only minimally.

It is a primary object of this invention to provide an arrangement for transporting trucks in tandem having the foregoing features.

Another object is to provide an apparatus for transporting trucks in tandem which is composed of relatively few simple parts, is rugged and durable in use, and is capable of being manufactured relatively inexpensively and easily assembled and disassembled.

Other objects, features and advantages of the invention will become more apparent as the following description proceeds, especially when considered with the accompanying drawings.

BRIEF DESCRIPTION OF THE DRAWINGS

FIG. 1 is a side elevational view showing a trailing truck reversed end-for-end and connected to a lead truck by a beam assembly enabling the trucks to be transported in tandem with the rear wheels of the trailing truck elevated above the ground, in accordance with the present invention.

FIG. 2 is a perspective view of a saddle mount which is a part of the apparatus of the invention.

FIG. 3 is a view partly in section taken on the line 3—3 in FIG. 4.

FIG. 4 is a view taken along the line 4—4 in FIG. 3.

FIG. 5 is a detail of one of the elements for clamping the beam to a saddle mount.

FIG. 6 is side view, similar to FIG. 1, of a lead truck connected to a trailing truck by means of an alternate embodiment of the invention.

FIG. 7 is a side elevation view of a from beam support embodying various features of the invention.

FIG. 8 is a cross-sectional view of the front beam support shown in FIG. 7 taken along line 8—8 thereof.

FIG. 9 is a side view, similar to FIGS. 1 and 6, of a lead truck connected to a trailing truck by means of an alternate embodiment of the invention wherein the lead truck includes a fifth wheel connection to the beam assembly while the trailing truck includes a frame saddle connection to the beam assembly.

FIG. 10 is an end view of a frame attachment constructed in accordance with various features of the invention.

FIG. 11 is a side view of the frame attachment shown in FIG. 10.

FIG. 12 is a side view of a lead truck connected to one end of the boom assembly by a frame saddle.

FIG. 13 is a side view of a frame saddle coupled to a rear beam support as shown in FIG. 9.

FIG. 14 is a side view of a rear beam support mounted to a fifth wheel.

FIG. 15 is an end view of the rear beam support shown in FIG. 14.

DETAILED DESCRIPTION

Referring now more particularly to the drawings, there is shown a lead truck T1 connected to a trailing truck T2 by a beam assembly 10 enabling the trailing truck T2 to be pulled along a roadway 12 by the lead truck. The trailing truck is reversed end-for-end so that its rear end is adjacent to but longitudinally spaced from the rear end of the lead truck. The tracks are thus arranged in tandem and the arrangement is such that the rear wheels of the trailing truck are raised only enough to be out of contact with the ground to facilitate transportation.

The beam assembly 10 comprises an elongated rigid beam 14 and three saddle mounts 16, 18 and 20 which may be, but are not necessarily, of identical construction as will be understood as this description proceeds.

The foremost or front saddle mount 16 comprises a pair of support plates 22 and 24, an elongated cylindrical, horizontal shaft 26 extending between and rotatably supported by the support plates, a platform 28 rigidly mounted on the shaft 26 between supports 22 and 24, a saddle 30 pivotally mounted on the platform 28, and clamps 32 and 34 on the saddle. The saddle mount 16 is preferably located on the longitudinal centerline of the truck T1 and is shown mounted on the top surfaces of the laterally spaced, longitudinally extending bars 31 which are in turn mounted on the longitudinally extending channels 29. The channels 29 form at least a portion of the rear bed of the lead truck T1. The truck T1 is shown as having a cab 33 at the front which is considerably higher than the rear bed of the truck and may, for example, have an overall height of as much as 13 feet. The trailing truck T2 may be of a similar or identical construction.

Each support plate is formed with four holes adapted to receive U-bolts 36 which extend around the longitudinal bars 31 and channels 29 of the lead truck T1. The ends of the U-bolts are secured to the support plates by nuts 40. Each support plate has a narrow extension along its inner edge indicated at 42. Aligned, cylindrical sleeves 44 are rigidly mounted on the top surfaces of these extensions.

The shaft 26 extends horizontally between support plates 22 and 24, and its ends are journaled for rotation in the sleeves 44.

The platform 28 is a flat rectangular plate rigidly secured as by welding to shaft 26 between the support plates 22 and 24.

The saddle 30 has a flat rectangular plate 52 parallel to and in overlying contact with the platform 28. The saddle is mounted on the platform 28 for rotation about an axis at right angles to the longitudinal axis of the shaft by means of a pivot member or bolt 54. The two parallel clamps 32 and 34 on the top surface of saddle plate 52 are on opposite sides of the bolt 54. The bolt 54 extends through the shaft and through the platform plate 48 and saddle plate 52. A nut threaded on the opposite end of the bolt secures the connection.

The clamps 32 and 34 have parallel fixed jaws 70 and parallel moveable jaws 72. Each fixed jaw is rigidly secured to saddle plate 52 and has a generally C-shaped clamping portion 74. The moveable jaw is in the form of an elongated stud which is return bent on one end to provide a C-shaped clamping portion 76 opposed to the clamping portion 74 of the fixed jaw. The moveable jaws are mounted for sliding movement within passages 78 in the fixed jaws. The passages 78 are parallel and extend at right angles to the longitudinal axis of the shaft 26 and also at right angles to the bolt 54. The moveable jaw 72 of each clamp can thus be moved to place its C-shaped clamping portion 76 in different positions with respect to the clamping portion of the fixed jaw 70. A nut 80 is threaded on the end of each moveable jaw opposite to its C-shaped clamping portion.

A bar 82 of inverted T-shape is rigidly secured to a mounting plate 84 which is clamped to the underside of the beam 14 by bolts 86 and a top clamping plate 88 in a manner such that the bar 82 extends perpendicular to the beam 14. The lower cross member 90 of bar 82 is adapted to be gripped by the jaws 70 and 72 of the front saddle mount 16. The elements 82–90 comprise a clamping unit 92 by means of which the beam 14 is rigidly attached to the jaws 70 and 72.

The two other saddle mounts 18 and 20 may be, and in this instance are, identical to saddle mount 16. The beam 14 is rigidly attached to the jaws of the saddle mounts 18 and 20 at points spaced lengthwise along the beam by clamping units 92 of the same type as employed for attaching the beam to the jaws of the saddle mount 16. The saddle mounts 18 and 20 are rigidly secured to the bed of the truck T2 at spaced points on the longitudinal centerline of truck T2. Preferably the saddle mount 20 is slightly elevated relative to saddle mount 18 by shims 93 so that the beam 14 slants downwardly and rearwardly from truck T2 beyond the rear end of the latter. Because the beam is attached to the bed of truck T2 at two longitudinally spaced points, ff the free end of the beam is raised, the rear end of truck T2 is also raised.

In use, the beam 14 is attached to truck T2 as described above. The truck T2 is turned end for end and placed behind truck T1 so that the two trucks are in tandem with their rear ends adjacent to but spaced from one another. The free end of beam 14 is raised above saddle mount 16 of truck T1 and then lowered sufficiently to engage the cross member 90 of bar 82 into the jaws 70 and 72 after which the jaws are operated to clamp on the bar. In this position, the beam and the rear end of truck T2 are raised sufficiently to raise the rear wheels of truck T2 above and out of contact with the ground. The rear end of truck T2 is raised only enough that the rear wheels do not contact the ground. This is possible because the truck T2 is transported without having to be overlapped and supported on the rear end of lead truck T1. A relatively low maximum height of the trailing truck T2 is thus achieved. The front saddle mount 16 enables both vertical and lateral swinging of the beam, so that the trailing vehicle can track around corners and over rises and dips in the road. The saddle mounts 18 and 20 are shown as being of the same construction as saddle mount 16, but do not need to be since they together hold the beam rigid with respect to the trailing truck T2.

An alternate embodiment of the invention is shown in FIGS. 6–15. In this embodiment, the beam assembly 10' is optimized for transporting trucks for long distance delivery over interstate highways as opposed to relatively short distance emergency delivery to, for example, a repair facility.

In accordance with one aspect of the optimized configuration shown in FIGS. 6–15, the beam assembly 10' is configured so that its effective length can be shortened, if desired, to reduce the overall length of the lead truck T1 and trailing truck T2 combination. The ability to vary the effective length of the beam assembly 10' is important when it is necessary to ensure that the length of the combination does not exceed the maximum imposed by applicable legal regulations (i.e., seventy-five feet on interstate highways).

In the illustrated embodiment, the forward end of the beam 14' can be pinned to a front beam support 100 in any one of a number of different positions. The rear end of the beam 14 is connected to a rear beam support 102. The front beam support 100 and rear beam support 102 are detachably mounted on the lead truck T1 and trailing truck T2 respectively. The effective length of the beam assembly 10' can be changed by changing the amount by which the beam 14' extends through the beam support 100. In the illustrated embodiment, five opposed pairs of apertures or holes 104 are formed in the forward end of the beam 14' and three opposed pairs of complimentary apertures or holes 106 are formed in the front beam support 100. Two or more pins 108 extending through the aligned apertures in the forward end of the beam 14' and in the front beam support 100 secure the beam 14' to the from beam support 100. The effective length of the beam assembly 10' can be adjusted by selecting which holes 104 in the beam 14 align with which holes 106 in the front beam support 100 before the two are pinned together. In this manner, it is possible to shorten the total length of the combined lead and trailing trucks T1 and T2 to bring the combination within legal limits.

In accordance with another aspect of the invention, the optimized beam assembly 10' shown in FIGS. 6–15 provides flexibility to enable the assembly to be used in connection with any combination of trucks regardless of whether the trucks are or are not provided with fifth wheel assemblies. For example, in FIG. 6, both the lead truck T1 and the trailing truck T2 are attached to the boom assembly by means of their respective fifth wheel assemblies 110. In FIG. 9, the lead truck T1 is attached to the boom assembly 10' by means of a fifth wheel assembly 110 while the trailing truck T2 is not. In FIG. 12, the lead truck T1 is not attached to the boom assembly 10' by means of a fifth wheel 110.

To provide such flexibility, the front and rear beam supports 100, 102 that engage the lead truck T1 and the trailing truck T2 respectively each include a downwardly projecting king pin or trailer pin 112 that couples to a standard fifth wheel assembly 110. Alternatively, either or both of the front and rear beam supports 100, 102 can be inverted and coupled to the frame of the truck T1, T2 by means of a frame saddle 16' that can be similar or identical to that shown in FIG. 2. The frame saddle 16' is bolted to the frame of either truck T1, T2 by means of U-bolts 36 as previously described. The respective front or rear beam support 100, 102 is then inverted and coupled to the frame saddle 16' by means of the clamps 32 and 34. To facilitate such attachment, each front and rear beam support 100, 102 includes a mounting bar 114, opposite the king pin 112, that is engagable with the clamps 32 and 34.

Each of the front and rear beam supports 100, 102 includes two substantially parallel side plates 116, positioned vertically between horizontal top and bottom plates 118, 120, that define an open channel 122 through which the beam 14' is received. It will be appreciated that the beam 14' can be received in the channel 122 formed between the two side plates 116 regardless of whether the beam support 100, 102 is positioned with the king pin 112 down (mounting bar 114 up) for attachment to the fifth wheel assembly 110 or with the mounting bar 114 down (king pin 112 up) for attachment to the frame saddle 16'. One advantage of the optimized boom assembly 10' is that the same front and rear beam supports 100, 102 can be used in both fifth wheel and non-fifth wheel attachment configurations.

A frame attachment 124 that locks the mid portion of the beam 14' to the end of the trailing truck T2 and resists pivoting movement relative to the truck T2 is shown in detail in FIGS. 10 and 11. The frame attachment 124 includes a pair of parallel side plates 126 that are spaced from each other a distance sufficient to permit the passage of the beam 14' therebetween. The side plates 126 project upwardly from a base plate 128 and are supported by a plurality of gussets 130. The base plate 128 is mounted to the frame of the truck T2 by means of a plurality of U-bolts 36 much in the same manner as the frame saddle 16'. A pivoting top plate 132 extends over the beam 14' and pivots to accommodate the relative angle between the beam 14' and the frame of the truck T2.

Preferably, the boom 14', boom supports 100, 102, frame attachment 124 and frame saddle 16' are all formed of welded plate steel.

The alternative embodiment provides many advantages over prior systems. The adjustable length feature of the boom assembly permits adjustment of the overall length of a combined leading and trailing truck to bring such a combination within maximum length restrictions. The reversible or invertable front and rear beam supports permit convenient attachment to trucks that are equipped with fifth wheel assemblies and, with the addition of a standard frame saddle, permit convenient coupling to trucks lacking fifth wheel assemblies. In either case, the same set of front and rear boom supports can be used. The boom itself is a rigid, unitary structure that lacks moving parts and that provides strength and rigidity with relatively light weight. The frame saddle when used, along with the frame attachment, are secured to the truck frame by means of closely fitting U-bolts rather then chains as in the past. The use of U-bolts not only provides greater stability and security to the vehicle being towed but also minimizes the likelihood of frame and suspension damage as could occur with prior chain-based methods of attachment.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A beam assembly for connecting a first wheeled vehicle to a second wheeled vehicle with the first vehicle reversed end-for-end so that the rear ends of the vehicles are in confronting relation but not overlapped and the first vehicle can be transported by and in tandem with the second vehicle, said beam assembly comprising:

a rigid elongate beam having first and second ends;

a first beam support mountable on the first vehicle in an upright position with a king pin and mountable on the first vehicle in an inverted position with a mounting bar, for engaging and supporting said beam adjacent said first end;

a second beam support mountable on the second vehicle in an upright position with a king pin and mountable on the second vehicle in an inverted position with a mounting bar, for engaging and supporting said beam adjacent said second end;

a frame attachment mountable on the first vehicle for engaging said beam between said first and second ends to anchor said beam against pivoting movement relative to the first vehicle; and means for attaching said beam to said first and second beam supports at selected positions along said beam so that the relative distance between said first and second beam supports can be varied to vary the overall length of the tandem connected first and second vehicles.

2. A beam assembly as defined in claim 1 wherein one of said first and second beam supports defines a channel for receiving therethrough one of said ends of said beam and wherein said means for attaching includes one or more locking devices for securing said beam to said first or second beam support in one of a plurality of predetermined fixed locations of said beam relative to said channel.

3. A beam assembly as defined in claim 2 wherein said locking device includes a pin insertable through aligned holes formed in said first or second beam support and said beam for securing said beam against lateral movement relative to said first or second beam support.

4. A beam assembly as defined in claim 3 wherein each of said first and second beam supports comprises a pair of substantially horizontal, substantially parallel top and bottom plates separated by a pair of substantially vertical, substantially parallel side plates defining said channel for receiving therethrough said beam.

5. A beam assembly as defined in claim 4 wherein one of said top and bottom plates includes a substantially perpendicularly outwardly projecting kingpin for engaging a fifth wheel assembly and the other of said top and bottom plates includes a mounting bar for attachment to a frame saddle.

6. A beam assembly as defined in claim 5 wherein said apertures are formed in said side plates.

7. A beam support for coupling a rigid beam to a truck tractor equipped with either a fifth wheel or a frame saddle, said beam support comprising;

a first substantially horizontal plate having a king pin projecting substantially perpendicularly outwardly therefrom, said king pin engagable with a fifth wheel assembly;

a second substantially horizontal plate spaced from and substantially parallel to said first plate and having a mounting bar engagable with a frame saddle;

a pair of first and second spaced, substantially parallel side plates extending substantially vertically between and along said first and second horizontal plates to define a channel for receiving a beam positionable through said channel, said first and second side plates having a plurality of aligned holes formed therethrough for receiving a locking pin for locking a rigid beam against linear movement relative to said beam support; and said beam support thereby being invertable for attachment to the truck tractor either by means of said king pin or by means of said mounting bar.

8. A beam assembly for connecting a first wheeled vehicle to a second wheeled vehicle with the first vehicle reversed end-for-end so that the rear ends of the vehicles are in confronting relation but not overlapped and the first vehicle can be transported by and in tandem with the second vehicle, said beam assembly comprising:

a rigid elongate beam having first and second ends;

a first beam support mountable on the first vehicle for engaging and supporting said beam adjacent said first end;

a second beam support mountable on the second vehicle for engaging and supporting said beam adjacent said second end;

a frame attachment mountable on the first vehicle for engaging said beam between said first and second ends to anchor said beam against pivoting movement relative to the first vehicle; and means for attaching said beam to said first and second beam supports at selected positions along said beam so that the relative distance between said first and second beam supports can be varied to vary the overall length of the tandem connected first and second vehicles;

one of said first and second beam supports defining a channel for receiving therethrough one of said ends of said beam;

said means for attaching including one or more locking devices for securing said beam to said first or second beam support in one of a plurality of predetermined fixed locations of said beam relative to said channel;

said locking device including a pin insertable through aligned holes formed in said first or second beam support and said beam for securing said beam against lateral movement relative to said first or second beam support;

each of said first and second beam supports comprising a pair of substantially horizontal, substantially parallel top and bottom plates separated by a pair of substantially vertical, substantially parallel side plates defining said channel for receiving therethrough said beam; and, one of said top and bottom plates including a substantially perpendicularly outwardly projecting kingpin for engaging a fifth wheel assembly and the other of said top and bottom plates includes a mounting bar for attachment to a frame saddle.

9. A beam assembly as defined in claim 8 wherein said holes are formed in said side plates.

10. A beam support for coupling a rigid beam to a wheeled vehicle, said beam support comprising;

a first substantially horizontal plate having a king pin projecting substantially perpendicularly outwardly therefrom, said king pin being engagable with a fifth wheel assembly of a wheeled vehicle;

a second substantially horizontal plate spaced from and substantially parallel to said first plate and having a mounting bar engagable with a frame saddle mounted on the vehicle; and a pair of spaced, substantially parallel side plates extending substantially vertically between said first and second horizontal plates to define a channel for receiving therethrough said beam;

said side plates including a plurality of aligned holes formed therethrough for receiving a locking pin for locking the rigid beam against linear movement relative to said beam support;

said beam support thereby being invertable for attachment to the vehicle either by means of said king pin or by means of said mounting bar.

* * * * *

Disclaimer

5,722,677-Lichter et al., Kenosha, Wis (US). APPARATUS FOR THE TRANSPORTATION OF TRUCKS. Patent dated Mar. 3, 1998. Disclaimer filed Nov. 6, 2007, by the assignee, ATC Leasing Company, LLC.

Hereby enters this disclaimer to all complete claims of said patent.

(*Official Gazette February 19, 2008*)